United States Patent
Oddera

(10) Patent No.: US 11,166,591 B2
(45) Date of Patent: Nov. 9, 2021

(54) PROCESS FOR GRINDING AND DOSING COFFEE BEANS WITH AUTOMATIC AND CONTINUOUS DOSE CALIBRATION

(71) Applicant: FIORENZATO M.C. SRL, Vigonza (IT)

(72) Inventor: Manuel Oddera, Fonte (IT)

(73) Assignee: FIORENZATO M.C. SRL, Vigonza (IT)

( * ) Notice: Subject to any disclaimer, the term of this patent is extended or adjusted under 35 U.S.C. 154(b) by 352 days.

(21) Appl. No.: 15/349,238

(22) Filed: Nov. 11, 2016

(65) Prior Publication Data

US 2017/0127884 A1    May 11, 2017

(30) Foreign Application Priority Data

Nov. 11, 2015 (IT) .................. 102015000071452

(51) Int. Cl.
| A47J 42/44 | (2006.01) |
| A23F 5/08 | (2006.01) |
| A47J 31/42 | (2006.01) |
| A47J 42/40 | (2006.01) |

(52) U.S. Cl.
CPC ............... *A47J 42/44* (2013.01); *A23F 5/08* (2013.01); *A47J 31/42* (2013.01); *A47J 42/40* (2013.01)

(58) Field of Classification Search
CPC .... A23F 5/08; A47J 31/42; A47J 42/40; A47J 42/44
See application file for complete search history.

(56) References Cited

U.S. PATENT DOCUMENTS

| 5,462,236 A | 10/1995 | Knepler |
| 5,522,556 A | 6/1996 | Knepler et al. |
| 6,783,089 B2 | 8/2004 | Lassota |
| 2013/0133520 A1* | 5/2013 | Hulett ............. A47J 31/40 99/285 |

FOREIGN PATENT DOCUMENTS

| AU | 2016256785 A1 | 12/2016 |
| WO | 2013015801 A1 | 1/2013 |

OTHER PUBLICATIONS

Abe, JP3320203.*
Baratza Forté, operation manual, 2013 available at: www.baratza.com.

\* cited by examiner

*Primary Examiner* — Anthony J Weier

(57) ABSTRACT

Automatic process for calibrating the single and double dose of ground and dispensed coffee by means of a specific grinder-doser integrating a weighing device with a load cell. The process is automatically and steadily carried out during the ordinary activity, with no interruptions, adapting the grinding time according to the actually detected grammages, in order to get closer as much as possible to the desired grammage in any use condition. The process, after a preliminary phase for temporary configuring the desired grammages and the grinding time, conceives self-calibration cycles continuously repeated, each of them comprising three sequential phases: a first phase for automatically checking the dispensing with progressive weight detections, a second phase for automatically processing the detected data for determining the correct grinding time, a following third phase for the automatic setting.

1 Claim, 3 Drawing Sheets

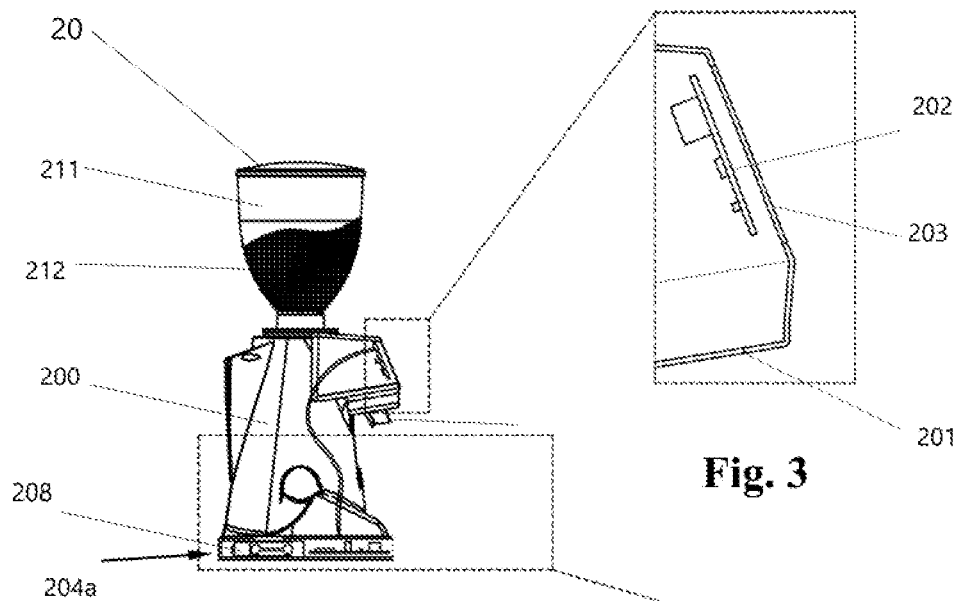
Fig. 2
Fig. 3
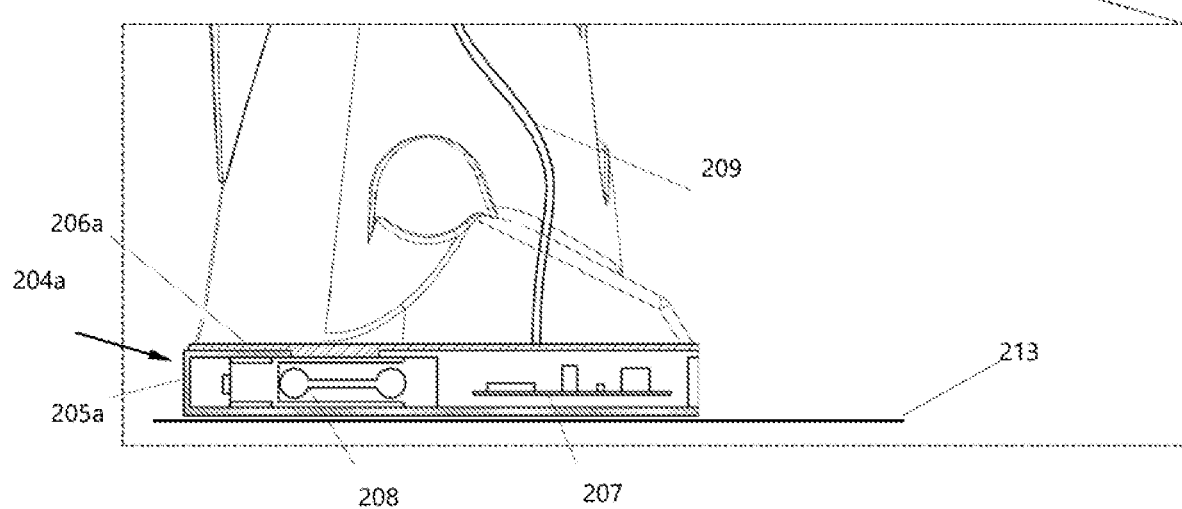
Fig. 4

PROCESS FOR GRINDING AND DOSING COFFEE BEANS WITH AUTOMATIC AND CONTINUOUS DOSE CALIBRATION

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

This invention relates to a process and an apparatus for grinding and dosing coffee beans with automatic and continuous dose calibration. In particular it is described an automatic process for controlling the grammage and automatically setting the grinding time in an electronic coffee bean grinder-doser, in which an electronic weighing device is integrated; furthermore the grinder-doser suitable for said automatic calibration is object of the present invention.

2. Description of Related Art Including Information Disclosed Under 37 CFR 1.97 and 37 CFR 1.98.

This invention applies in particular to the industrial sector of professional bars apparatuses, for preparing espresso coffee; furthermore, this invention suits to any electronic apparatus for grinding organic products where the periodic setting of the grinding time is necessary.

Generally professional machines for preparing espresso coffee, conventionally called coffee machines, are widely known and they are essentially provided with a body comprising a boiler generating hot water and vapour, which are dispatched to one or more distribution groups, so that they pass through a corresponding number of filter holder cups containing the ground coffee.

Filter holder cups, therefore, must be preliminarily filled in the filter with coffee powder in a specific machine suitable for grinding coffee and precisely dosing it, also called grinder-doser.

In particular, said filter holder cup, has to be filled in with the exact quantity of coffee powder according to the number of doses to be dispensed and to the expected quality; generally, in a professional field one or two doses are expected, in order to prepare one or two espresso coffee cups.

In a grinder-doser, coffee beans falling from a cone-shaped container positioned above the machine main body are grinded in such a way that the micro-granular powder is collected and correctly dispensed inside said cup. In a professional field, conventional or automatic grinder-dosers are used, wherein the first are provided with a toggle switch of a valve type letting the user control over how much and how coffee has to be grinded, while the second are provided with push-buttons and/or sensors that automatically control the coffee dispensing until it reaches a specific threshold.

Said electronic grinder-dosers advantageously limit the operations in charge of the operator who, therefore, only needs to position the cup corresponding to the desired dose and than to select said dose. Generally, the quantity of coffee related to one or two doses is previously configured by programming the parameters corresponding to the grinding duration, that is the engine working time necessary for dispensing the desired weight of the ground product.

It is also known to the experts in this field that in the professional activity it is extremely important to accurately set the grinding time in order to obtain the exact quantity in weight of actually ground coffee, this quantity is also called grammage; actually, grammage is not constant, as it varies according to the granulometry and to the type of coffee used, to the wearing of the machine and, particularly, to environmental conditions like humidity and temperature. Substantially, the grinding time is fixed, being configured with the initial programming of the apparatus, while the actually dispensed dose is from time to time slightly greater or lesser than the desired weight, according to said parameters. In order to compensate such variations, the professional expert periodically operates on the apparatus programming, manually modifying said exercise grinding time according to progressive approximations, in order to obtain the exact dispensed and ground coffee weight; this periodic setting operation is also called dose calibration.

Therefore it has been observed that, nowadays, conventional and known systems for carrying out said calibration are poorly suitable for a professional activity, wherein espresso coffee is very frequently prepared and in a high quality; in these cases it is therefore necessary to grind beans in compliance with the exact grammage, according the specifications required by the operator and also considering the aforementioned variables. Nowadays, grinder-dosers mainly used in professional field are conceived in such a way that in order to get closer to the desired dose, namely during the calibration phase, the operator directly sets the configured grammage values; alternatively, some devices allow the operator to modify the grinding time for each dose.

More specifically, with reference to known and conventional solutions for controlling and setting the actually dispensed dose, that is to calibrate said dose, there are, in particular, systems providing the ground product weighing, being manual as a periodic control sampling or being semi-automatic and simultaneous to the grinding.

PRIOR ART

In order to determine the prior art related to the proposed solution, it has been carried out a conventional verification, consulting public archives, that has led to the identification of some anteriority, among them:

D1 U.S. Pat. No. 6,783,089 (Lassota)
D2 U.S. Pat. No. 5,522,556 (Knepler et al.)
D3 Baratza Forté, operation manual, 2013 (www.baratza.com)
D4 WO2013015801 (Rego et al.)
D5 U.S. Pat. No. 5,462,236 (Knepler)
D6 ITUB2015A001304 (Oddera)

D1, D2 and D3 suggest electronic weighing systems that are constructively and electronically integrated in the grinder-doser in such a way to detect, during dispensing, the weight of the product with the exercise container in order to interrupt the grinding when the predetermined weight has been reached; the weighing device is a scale with horizontal plate, on which the container is laid, with single strain gauges like in D1 or with central load cell like in D3, or with side arm lever and opposite load cell with respect to the container, described in D2.

D4 describes a device for dosing and displaying the exact quantity of ground and dispensed coffee in a filter holder cup, in a professional coffee grinder-doser, the weight variation being measured from the cup support; this device is electronic and includes a remote display for displaying the measured value and it also includes a particular filter holder cup equipped with push-buttons with digital interface for the user.

D5 suggests a grinder-doser for calculating the weight of the desired dose as function of the grinding time, in such a way that the operator, by means of a particular electronic calibration circuit also interfaced with the logic control unit of the grinder-doser, manually inserts the actually ground dose weight in order to correct the programming.

D6 describes an electronic grinder-doser for coffee equipped with an electronic weighing device with load cell, directly connected to the logic control unit of the grinder-doser, allowing to the professional operator to often recalibrate the grammage according to the actually ground and dispensed product quantity, by means of a semi-automatic setting process to be carried out separately with respect to the ordinary activity, which involves: interruption of the ordinary activity, namely of the normal dispensing service, manual sampling and weighing of numerous samples, calculation of the new grinding time according to a specific algorithm, automatic programming of said logical unit, restarting of the ordinary activity with the new grinding time.

Ultimately it is therefore reasonable to disclose:

A coffee bean grinder-doser comprising manual or electromechanic means electronically controlled, for dosing the ground and dispensed product quantity in the filter holder cup, in one or two doses;

An electronic grinder-doser for professional use wherein the desired grammage is configured at the beginning and consequently the corresponding grinding time is calculated, being fixed till the next setting;

An electronic grinder-doser wherein the grammage is measured during the dispensing, being the coffee directly weighed with its exercise container by means of an integrated weighing device and connected to the logic unit control, in order to automatically interrupt the grinding when the previously configured weight has been reached;

A system for controlling and calibrating the dispensed dose, for coffee grinder-dosers based on configuring the grinding time, which involves the sampling of a dose or a progressive series of actually ground doses to be separately weighed for a manual change of the programming, for progressive approximations, or inserting the detected weights in an interposed interface circuit that automatically calculates and sets.

Drawbacks

Most of the above-described solutions aim to overcome the known daily difficulty for the professional operator to obtain from the grinder-doser the exact quantity of actually ground and dispensed coffee, that is the desired grammage; in general, it has been found that conventional solutions based on the sampling and on the detection of the weight of a sample dispensing, in order to calculate the corrections to bring on the programming of the apparatus are slow, unpractical and also imprecise, as various approximations are necessary before obtaining the desired result. In practice it has been verified that a common external scale involves numerous manual operations, with also multiple error possibilities. Moreover it is widely known that conventional calibration solutions for grinder-dosers, meant for preparing espresso coffee, include separate and additional operations that slow down the ordinary professional exercise and distract the operator.

In the solutions that weigh the product during the dispensing, like for example in D1, D2 and D3, there is a problem intrinsically linked to the tolerances of the weighing devices and that makes such solutions little effective. In particular, it has been noted that in order to dynamically and precisely measure weight variations in dispensing small product quantities, being generally included between 7 and 7.5 grams for single doses, a sensible and very precise weighing device is necessary, for example an electronic load cell with strain gauges; however is known that such a device is unsuitable if used during grinding, because of the powerful vibrations transmitted by the internal engine of the grinder-doser to the entire machine body, make the value of single weightings not reliable and also cause decalibrations to the whole system. Furthermore, in solutions with direct weight detection like for example in D3, it has been found that the weighing device is not used as a calibration instrument, that is no processing of the detected values occurs in order to calibrate the operative parameters, but it is instead used as a limit switch, namely it substantially acts as a switch, switching off the power supply of the engine when the preconfigured weight is reached, in order to stop the grinding. Therefore it has been found that such solutions are inaccurate, not very stable and not suitable for instantaneous grinder-dosers wherein the dose is made up of a few grams, that is to be used in bars in order to prepare espresso coffee by means of filter holder cups; such solutions are instead more suitable for grocery models, wherein the weighing device is substantially an external scale suitable for high grammages, as a not completely integrated accessory.

It has also been found that the solutions suitable for controlling the dispensed dose which include a removable and heavy container of the ground product, that is with a considerably greater tare with respect to the content and with asymmetric shape and protruding in order to be manipulated and/or continuously removed, are unsuitable to ensure high precision in detecting quantities, variable of few hundredths gram one from the other, how it happens for example in D4 wherein the filter holder cup is separately weighed on a small-sized island device equipped with electronic interface; in a professional field, therefore, such a solution is expensive, fragile, unpractical to use and inaccurate in the result.

Among the semi-automatic solutions, in D5 a complicated electronic calibration circuit interacting with said logical unit, acting as a user interface has been added. The user carries out the weighing and manually inserts the data according to a particular process, which is not very easy to be frequently used in a professional field. In D6, instead, the operator must suspend the ordinary dispensing in order to carry out the semi-automatic calibration cycles, by manually sampling multiple ground coffee samples in order to detect the exact weight and consequently carry out the calibration; such a solution, even if effective in the settings, takes a long time in the execution and requires considerable attention by the operator in order to carry out the checkweighing according to the procedure required by the process. Moreover, such a solution involving sampling of individual samples, presents the obvious difficulty in reusing the product already dispensed for said setting purposes, being the used coffee of high quality, expensive and quickly perishable.

From the above considerations, in particular, it is not known and is widely desirable in a professional field a high-precision calibration process, independently operating during the ordinary activity, which automatically performs detections and settings, allowing in a professional field a continuous re-calibration of the grinding duration parameters according to the actually dispensed doses, in order to get closer as much as possible to the desired grammage, and in any activity condition. Furthermore, is not known and is widely desirable a process and an apparatus suitable for eliminating the numerous periodic interruptions necessary nowadays for said calibration, and also for eliminating any intervention or distraction for the operator.

All considered, it is reasonable for the companies in this field to require innovative solutions and useful for overcoming at least the above mentioned detected problems.

BRIEF SUMMARY OF THE INVENTION

These and other aims are reached by the present invention according to the characteristics in the included claims, wherein the mentioned problems are solved by means of an automatic process (10) for calibrating the single and double dose of ground coffee and dispensed from a specific grinder-doser (20) integrating a weighing device (204$a$-$b$) with load cell (208); said process (10) is automatically and continuously carried out during the ordinary activity, without interruptions, adapting the grinding time (TX, TY) according to the actually detected grammages (PX1-$n$, PY1-$n$), in order to get closer as much as possible to the desired grammage (PDX, PDY) in any condition use.

Said process (10), after a preliminary configuration phase (100) of the desired grammages and of the temporary grinding time (PX, PY), requires continuously repeated self-calibration cycles (101), of which each comprising three sequential phases (102-4): a first phase (102) for automatically checking the dispensing by means of progressive sampling of the weight, a second phase (103) for automatically processing the data in order to determine the correct grinding time, a consequent third phase (104) for automatic settings.

Aims

In this way, thanks to the remarkable creative contribution generating an immediate and important technical progress, different and notable aims have been achieved.

A first aim is to achieve a process and an apparatus for grinding and dosing coffee beans with automatic dose calibration, allowing in an easy and cheap way the continuous compliance of the grinding time related to the single and double dose with the actually dispensed grammages, getting closer as much as possible to the exact desired weight for each dose. It is, therefore, possible for the professional operator to keep the weight constant and therefore also the final quality of the espresso coffee served to the customer in an espresso coffee cup, limiting the influences caused by the different variables such as, for example, the state of preservation of the beans, the maintenance state of the machine and the environmental conditions.

A second aim is to eliminate the conventional periodic service interruptions that are necessary to carry out said calibration separately from the ordinary activity as it happens instead with the known and conventional systems. Moreover, costs due to time and/or to samplings required by said operations are eliminated.

A third aim is to eliminate any operator intervention, reducing therefore distraction occasions, fatigue or human errors.

A further aim of the invention is the use of integrated load cells in such a way to guarantee a constant dispensing stability and detections reliability to the apparatus, in any condition that could change the exact quantity of ground product required; the suggested adjustment or calibration system is advantageously applicable to modern electronic grinder-dosers, which are combined with bar devices for espresso coffee extraction, therefore with conventional filter holder cups for coffee machines.

In conclusion, these advantages, have the important quality of obtaining a calibration process for professional use also with the grinder-doser suitable for implementing it; said process is precise and reliable, being based on the weight detected after each dose is actually dispensed, when the engine is stopped and it is also extremely simple as it is carried out automatically. Overall, it is therefore designed a calibration system for an improved use and constructively simplified, even well equipped with technological content; moreover, the invention is cheap and can be manufactured in a high quantity thanks to the modern industrial processes.

These and other advantages will be included in the following detailed description of a preferred solution according to the included drawings.

BRIEF DESCRIPTION OF THE SEVERAL VIEWS OF THE DRAWINGS

FIGS. 2, 3 and 4 orthogonally represent an overview and two side and sectional detailed views of the electronic grinder-doser suitable for carrying out the automatic calibration process proposed; in a first embodiment with the electronic weighing device integrated under the main body as a base.

DETAILED DESCRIPTION OF THE INVENTION

Figure 1:
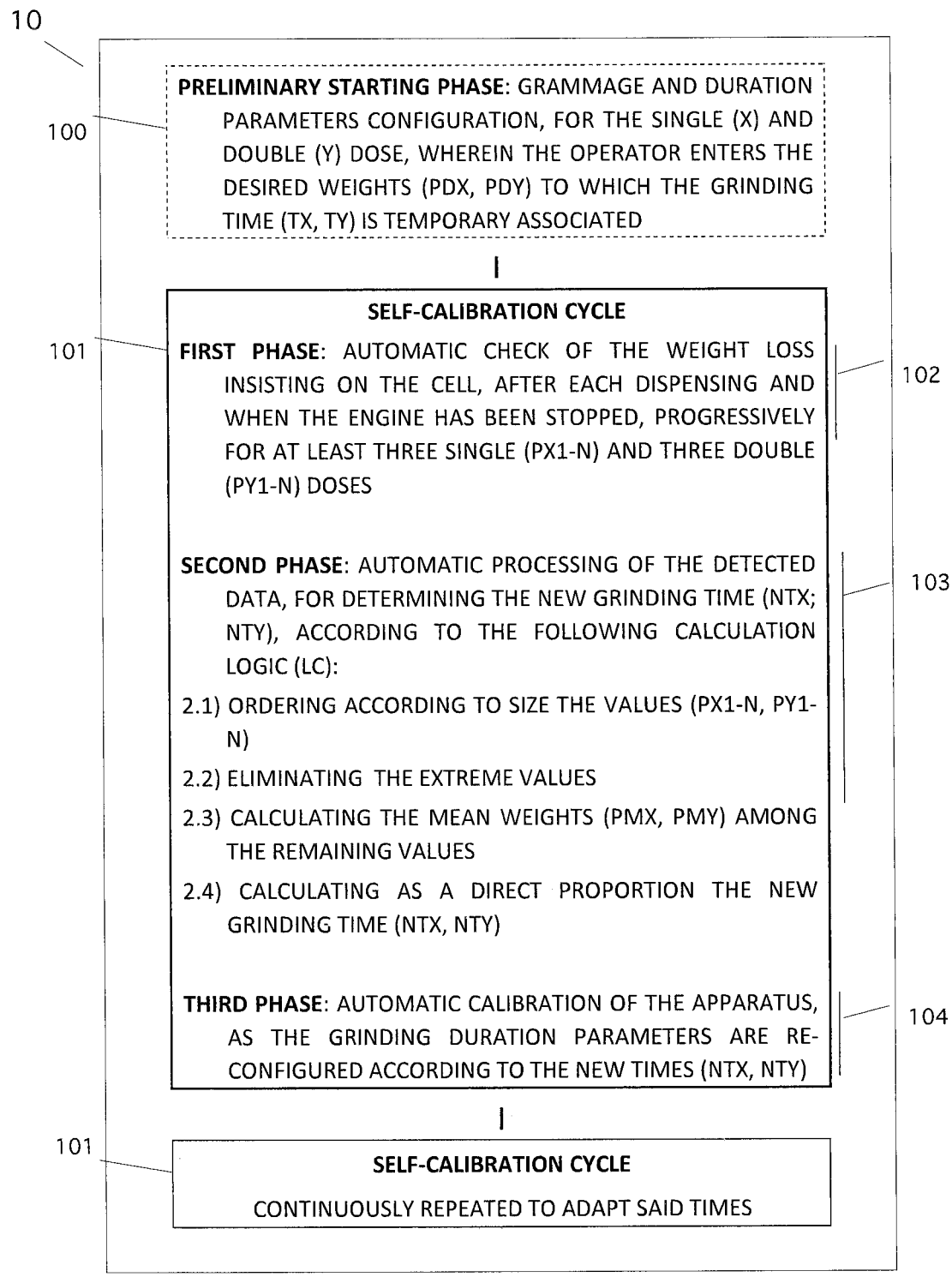
FIG. 1 schematically represents the automatic calibration process provided by the invention; it has to be noted that the initial phase is conventionally indicated with a dotted rectangle, being known and carried out only at the beginning for the parameters configuration, while the innovative self-calibration cycles are repeated, in other words identically and autonomously carried out in a continuous way by the grinder-doser.

The present innovation refers to an automatic calibration process (10) of the single (X) and double (Y) dose of ground and dispensed coffee, continuously carried out; said process is applicable in an easy way by means of a grinder-doser (20) suitable for this aim, being equipped with an entirely integrated weighing device (204$a$-$b$, 208). The invention is conceived in such a way that at beginning, in the grinder-doser the desired grammage for each dispensing, that is the exact desired weight in grams to be obtain from said single dose (PDX) and from the double dose (PDY) is configured; once configured, this value remains fixed as a reference, while the grinding time associated to the doses (TX, TY) will be adapted, that is the parameters related to the duration of the dispensing will be set in order to obtain the desired grammages. Such an operation is also called time calibration or adjustment; as it is autonomously carried out by said apparatus (20) during the ordinary exercise, it is therefore conventionally called self-calibration, or automatic calibration or even automatic adjustment.

In the practice, it has been verified that precision in such a configuration should be considered net of an innate error in doses which is detectable from time to time and it is usually about a tenth of gram; this error or gap is mainly due to the always variable use, wear conditions, or other above described causes. The main aim of this invention is therefore to overcome said error, continuously and automatically adapting said times (TX, TY) in such a way to get closer as much as possible to the desired grammage (PDX, PDY). To this aim, the weight of the actually ground and dispensed coffee (PX1-$n$, PY1-$n$) has to be considered as directly proportional to the configured grinding time (TX, TY), for each dose (X, Y).

Substantially, the innovative automatic calibration process (10) is conceived for calculating net weight variations, in grams, of the coffee beans (212, PK) in the cone-shaped container (211), or bell-shaped coffee bean holder, by means of the total weight (PT) insisting on the load cell (208), being known the weight (PM) of the single apparatus, or of its portion, without the contained product. After dispensing each dose, when the engine is stopped, said cell (208) perceives the weight variation, and namely the loss in weight corresponding to the quantity of ground and dispensed product, and the data, in grams, corresponding to each detected value are transmitted to the program or software, which is loaded in the logical unit (202). Said program, after a predetermined number (n) of weightings, or rather progressive samplings, processes the obtained data; therefore the various weightings (PX1-$n$, PY1-$n$) are calculated for weight difference, keeping as a reference the optimal weightings, that is eliminating those wrong weightings, and namely the extreme values for each dose (X, Y). The optimal weightings are calculated as the arithmetical mean of the considered values, in other words with no extreme value, therefore the new grinding time (NTX, NTY) is determined on the basis of the obtained result and as a direct proportion.

As a result, parameters of the grinding duration are automatically increased or decreased, adapting them in such a way to obtain, for each dose, a value in grams close as much as possible to the desired weight (PDX, PDY), and namely said desired grammage. Thanks to the advantageous proposed process (10) it is possible for the professional operator to always have an optimally set grinder-doser, without having to carry out any manual or additional operation with respect to the ordinary exercise.

More in detail, said automatic process (10) for calibrating the coffee dose, automatically, or rather autonomously performs both the control and the setting of the grinding duration (TX, TY) in order to obtain the desired grammage (PDX, PDY), being said process (10) especially suitable for an electromechanical coffee bean grinder-doser (20) which also includes: an electronic weighing device (204$a$-$b$) of the load-cell type (208), a logic control unit (202) of the apparatus and a management program loaded in said logical unit; wherein the desired values in weight (PDX, PDY) for each single or double dose of ground and dispensed coffee, or grammage, are fixed and configured by the operator in a preliminary phase (100) before starting said grinder-doser (20) in such a way that the grinding time (TX, TY) or duration is temporary associated to the values. In particular, said automatic process (10) occurs during the ordinary professional activity according to repeated self-calibration cycles (101,102-4), that is identical to each other and autonomously carried out on a continuous basis by the grinder-doser (20), adapting said grinding time (TX, TY) in such a way to obtain said grammages (PDX, PDY) in any use condition and to overcome known problems.

Every self-calibration cycle (101) comprises three sequential phases (102-4):

A first phase (102) for automatically checking the dispensing, detecting the weight variation at the end of each dispensing, made when the engine is stopped, in such a way to record the progressive weight loss of the coffee beans corresponding to at least 3 single doses (PX) and 3 double doses (PY) and namely carrying out one detection after the other until controlling the grammage of at least 3 dispensings for dose;

A second phase (103) for automatically processing the data detected in the previous phase, according to a calculation logic (LC) suitable for determining the new grinding time (NTX, NTY), for the single dose and the double dose;

A third phase (104) for the automatic calibration, wherein the apparatus autonomously configures said new times (NTX, NTY) of the previous phase.

Said calculation logic (LC) includes at least the following sequence of operations: a) ordering according to the size those results, b) eliminating the extreme values, that is each heaviest and lightest dose, c) calculating the arithmetic mean between the remaining values for each dose, d) finally determining the new grinding duration parameters, that is calculating as direct proportion said new times (NTX; NTY) in such a way to obtain grammages close as much as possible to the desired weights (PDX, PDY) for each dispensing, which remain fixed as references.

The process (10) object of this invention is conceived in such a way that, preferably, between two consequential self-calibration cycles (101,102-4) no interruption occurs, that is at the end of a cycle (101) another begins right away (101). However, for particular operative requirements and/or for statistic calculations, or in order to reduce the energy consumption or even to extend the life cycle of components, in an alternative execution of the invention it is possible that between two self-calibration cycles (101) there is a temporary interruption, namely an interval at the end of each complete cycle (102-4) is planned; said interval, for example, can have a duration corresponding to a fixed number of dispensings or on the whole between 3 and 100 dispensings considering the single (X) and double doses (Y).

Is also known that in the daily professional use of a grinder-doser (20) it is possible to have alternations between requests for single (X) and double doses (Y); it is therefore verified in the practice that a self-calibration cycle (101) made as above described (102-4) is effective enough considering at least 3 single dispensings (X) and 3 double dispensings (Y). In the preferred but not exclusive embodiment of the invention (10), each self-calibration cycle (101) provides 4 single dispensings (X1-4) and 4 double dispensings (Y1-4), that is 8 total dispensings, according to the three sequential phases (102-4) described above; the following cycle (101) will be therefore carried out in the same way (102-4) but with modified grinding times, i. e. it is calibrated from time to time according to said new grinding time (NTX, NTY), and so forth for all the following cycles (101, 102-4).

Example

A practical example of the application of the automatic calibration process (10), object of this invention, is reported below, wherein, after said preliminary phase (100) for starting the grinder-doser (20), a continuous series of said self-calibration cycles (101), each of which including 4 single dispensings (X1-4) and 4 double dispensings (Y1-4), for a total of 8 dispensings is expected; it has to be noted that each cycle (101) follows said three sequential phases (102-4) in an automatic way, namely it is autonomously executed by the grinder-doser (20) during the ordinary exercise, that is without interrupting the activity. After each calibration cycle (101), therefore, it happens that the following cycle (101) is executed in the same way, but with modified grinding time (TX, TY), that is with automatically calibrated duration parameters in such a way that the actually detected grammages (PX, PY) get closer as much as possible to the desired grammages (PDX, PDY), and so forth for all the following cycles.

Preliminary Phase (100)

PK=1500 g.
PM=10000 g.
PT=PK+PM=1500 g+10000 g=11500 g
PDX=7 g
TX=2 sec
PDY=14 g
TY=4 sec Self-Calibration Cycle (101)

First phase (102): automatic detection of the total weight variation, at the end of each of the 8 dispensings (PT1-8); more in detail, the total weight loss is calculated after each single (X1-4) and double (Y1-4) dispensing in order to obtaining the actual weight (PX1-4, PY1-4) of each actually grind and dispensed dose according to the temporary assigned grinding time (TX, TY). The following sequence is therefore expected:

DISPENSING 1=detection of the single dose no. 1 (X1)
  a) Dispensing according to the assigned grinding time (TX);
  b) PT1=11493.5 g=first total weight detected by the cell;
  c) PX1=PT−PT1=11500 g−11493.5 g=6.5 g=actual weight of dose X1.

DISPENSING 2=detection of the double dose no. 1 (Y1)
  a) Dispensing according to the assigned grinding time (TY);
  b) PT2=11478.4 g=second total weight detected by the cell;
  c) PY1=PT1−PT2=11493.5 g−11478.4 g=15.1 g=actual weight of dose Y1.

DISPENSING 3=detection of the double dose no. 2 (Y2)
  a) Dispensing according to the assigned grinding time (TY);
  b) PT3=11463.6 g=third total weight detected by the cell;
  c) PY2=PT2−PT3=11478.4 g−11463.6 g=14.8 g=actual weight of dose Y2.

DISPENSING 4=detection of the single dose no. 2 (X2)
  a) Dispensing according to the assigned grinding time (TX);
  b) PT4=11457.4 g=fourth total weight detected by the cell;
  c) PX2=PT3−PT4=11463.6 g−11457.4 g=6.2 g=actual weight of dose X2.

DISPENSING 5=detection of the single dose no. 3 (X3)
  a) Dispensing according to the assigned grinding time (TX);
  b) PT5=11451.1 g=fifth total weight detected by the cell;
  c) PX3=PT4−PT5=11457.4 g−11451.1 g=6.3 g=actual weight of dose X3.

DISPENSING 6=detection of the single dose no. 4 (X4)
  a) Dispensing according to the assigned grinding time (TX);
  b) PT6=11444.7 g=sixth total weight detected by the cell;
  c) PX4=PT5−PT6=11451.1 g−11444.7 g=6.4 g=actual weight of dose X4.

DISPENSING 7=detection of the single dose no. 3 (Y3)
  a) Dispensing according to the assigned grinding time (TY);
  b) PT7=11429.4 g=seventh total weight detected by the cell;
  c) PY3=PT6−PT7=11444.7 g−11429.4 g=15.3 g=actual weight of dose Y3.

DISPENSING 8=detection of the double dose no. 4 (Y4)
  a) Dispensing according to the assigned grinding time (TY);
  b) PT8=11414.5 g=eighth total weight detected by the cell;
  c) PY4=PT7−PT8=11429.4 g−11414.5 g=14.9 g=actual weight of dose Y4.

Second phase (103): automatic processing of the results (PX1-4 PY1-4) obtained in the previous phase (102), according to said calculation logic (LC).

For the single dose (X) the following calculations are performed:
  a) X2=6.2; X3=6.3; X4=6.4; X1=6.5=ordered values;
  b) X3=6.3; X4=6.4=extreme eliminated values;
  c) (X3+X4)/2=6,35 g=mean weight;
  d) New TX=TX/detected mean weight*PDX=2 sec/6,35 g*7 g=2.20 sec.

For the double dose (Y) the following calculations are performed:
  a) Y2=14.8; Y4=14.9; Y1=15.1; Y3=15.3=ordered values;
  b) Y4=14.9; Y1=15.1=extreme eliminated values;
  c) (Y4+Y1)/2=15,00 g=mean weight;
  d) New TY=TY/detected mean weight*PDY=4 sec/15,00 g*14 g=3.73 sec.

Third phase (104): automatic setting of the parameters related to the grinding duration, as a self-calibration.

Times related to the single (TX) and to the double (TY) dose are autonomously adapted in order to obtain the desired weights (PDX, PDY), as a temporary configuration, according to what determined in the previous phase (103).

TX=2.20 sec. The time previously configured for the single dose (X) has been increased of 0.20 sec.

TY=3.73 sec. The time previously configured for the double dose (Y) has been reduced of 0.27 sec.

In order to accurately and easily carry out the above described automatic calibration process (10), a grinder-doser (20) integrating an electronic weighing device (204a-b) with at least one load cell (208) is conceived; said cell is particularly integrated in the main body (200, 205a-b, 206a-b) of the apparatus (20) in such a way to autonomously and accurately detect, at the end of each dispensing and when the engine is stopped, the exact weight loss, which also corresponds to the actually ground and dispensed coffee dose. To this aim, said cell (208) is directly controlled by the logical unit (202) that checks the grinder-doser (20), comprising the apparatus management program, as well as the instructions necessary to autonomously perform, during the ordinary exercise, said self-calibration cycles (101) with said phases (102-4).

More specifically, said grinder-doser (20) includes the main body (200) comprising the conventional grinding and dispensing means, as well as the frontally protruding dispensing spout (210) and wherein in particular, above it, there is an instrument panel (201) containing the main electronic command devices, among which the logic control unit (202) and a screen (203), which is preferably like a control panel of the touch screen type. In particular, it is expected the weighing device (204) with a load cell (208) to be integrated into the apparatus (20, 200) from a structural (205) and also electronic (202, 207, 209) point of view; to this aim, a portion of the main body substantially works as a containment structure for said device (204); it is separated from the main body, but at the same time complementary to it (200), comprising a loading surface (206) insisting on the cell (208) in such a way to accurately detect the progressive weight loss after each dispensing of ground coffee, autonomously performed with stopped engine.

Figures 5, 6:
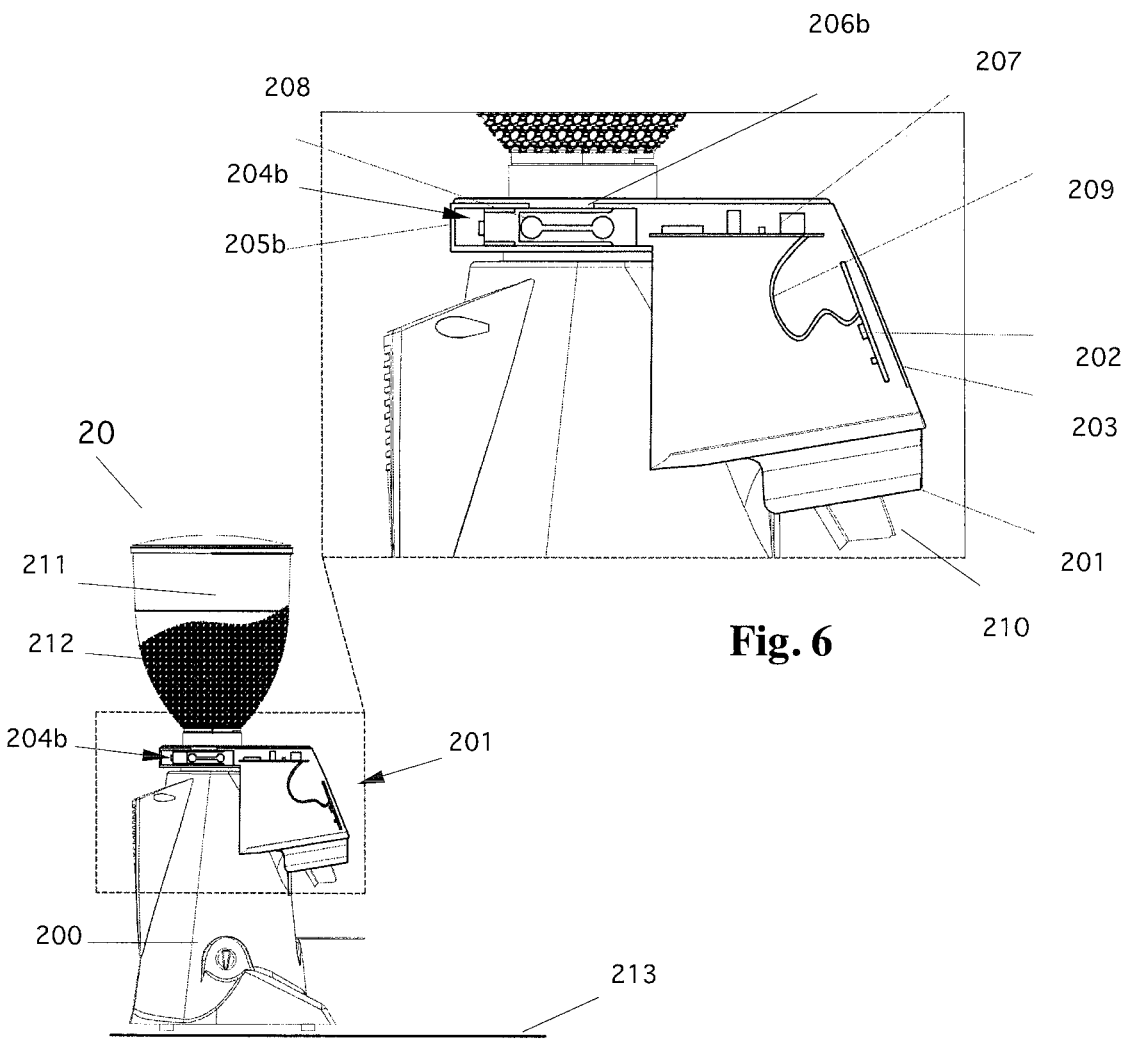
FIGS. 5 and 6 orthogonally represent an overview and a side and sectional detail view, of the electronic grinder-doser suitable for carrying out the automatic calibration process proposed; in a second embodiment with the electronic weighing device integrated above the main body in correspondence to the connection with the cone-shaped container.

According to the preferred embodiment, there are two structural variations (204a-b, 205a-b, 206a-b): in the first variation (FIGS. 2-4) the load cell is integrated in correspondence to the base (204a) and namely under the main body (200), in the second variation (FIGS. 5-6) said cell is integrated in correspondence to the connection (204b) with the cone-shaped container (211), that is above main body (200), in such a way that on said cell (208), in the first case (204a), the total weight of the apparatus portion insists over it (206a) or, in the second case (204b), only the weight of said container (206b, 211-2) insists on said cell.

In principle, the invention includes a high precision weighing device (204a-b), of the electronic scale type with horizontal detecting surface, with load cell (208) of the point load type and conventionally called single point load cell, being suitable to accurately detect a weight between 0 and 20 grams measuring variations to the nearest hundredth of a gram; at least the actual weighed value in gram hundredths is immediately available from said load cell (208) for the logic control unit (202), at the end of the dispensing and namely when the engine is stopped, in order to ensure the maximum detecting stability and reliability. Said cell (208) is powered by a power transformer (207) which is, like the cell itself, directly controlled by said logic unit (202). As a non-exhaustive example, a cell like the one marketed by the German company Siemens named Siwarex R Load Cells—Sp Series—is suitable for this invention in the personalized configuration for weights lower than 0.1 Kg and detections to the gram hundredth.

In this invention it is described, for manufacturing and descriptive simplification purposes, a device weighing (204-9) with load cell (208), comprising a single cell; however, also the use of multiple cells is conceived, when this allows to increase the detection quality or in case of a specific manufacturing and/or applicable configuration of this invention (10, 20); as a non-exhaustive example, a cell couple (208) equal to each other and powered by the same transformer (207) is sometimes suitable.

Finally, it has been verified in practice that said automatic calibration process (10) and the electronic grinder-doser (20), allow the professional operator to considerably simplify its work, with less physical and mental fatigue, and to provide a constantly calibrated apparatus in order to guarantee a greater quality service and to accurately obtain the exact desired grammage of the actually ground and dispensed coffee, notwithstanding the numerous variables involved.

REFERENCES

(10) automatic calibration or adjustment process, for grinding and dosing coffee beans with continuous control and automatic setting of the grinding time, according to repeated self-calibration cycles;
(100) preliminary phase for starting the grinder-doser;
(101) repeated self-calibration cycles, each including the following sequential phases
(102-4): a first phase (102) for automatically checking the actually dispensed doses, a second phase (103) for automatically processing the detected data, determining the new grinding time, a third phase (104) for automatically calibrating the parameters;
(20) electronic grinder-doser for coffee beans, of electromechanical type with electronic control, equipped with an electronic weighing device with load cell for the automatic and continuous grammage control and the automatic setting of the grinding time;
(200) main body of the grinder-doser;
(201) instrument panel containing the electronic command devices;
(202) logic control unit;
(203) screen, of the touch screen type, working as a control panel;
(204) weighing device with load cell, comprising the following variations: (204a) with integrated cell in correspondence to the base or under the main body; (204b) with integrated load cell in correspondence to the connection of the cone-shaped container, that is above the main body;
(205) weighing device structure, comprising the following variations: (205a) integrated under the main body, working as a base, or (205b) integrated above the main body in correspondence to the connection of the cone-shaped container;
(206) load surface insisting on the cell, comprising the following variations: (206a) bottom surface of the apparatus; (206b) connection of the cone-shaped container;
(207) power transformer of the load cell/s;
(208) load cell, of the so-called single point type with horizontal load surface;
(209) power supply cord and data transfer;
(210) dispensing spout;
(211) cone-shaped container for roasted coffee beans;
(212) coffee beans;
(213) grinder-doser supporting surface;
(LC) calculation logic of the detected weight values;
(NTX, NTY) new grinding time, determined by every self-calibration cycle;
(PDX, PDY) desired grammage, that is desired weight in grams for the single and double dose, determined at the start;
(PMX, PMY) detected mean weight for single and double doses;
(PK) weight of the coffee beans, known at the beginning; (PM) apparatus weight, or part of it; (PT) total weight insisting on the cell;
(PX, PY) weight in grams of the dispensed dose, for each single (PX1-$n$) and double (PY1-$n$) dose dispensed in a progressive sequence;
(TX, TY) grinding duration, that is the grinding time initially associated to the grammage desired for each dose;
(X, Y) dose, single and double respectively, also referring to single (X1-$n$) and double (Y1-$n$) doses dispensed in progressive sequence.

I claim:
1. An automatic calibration process for a single or a double dose of ground coffee so as to automatically check and adjust a grinding time of a grinder-closer so as to obtain a desired weight of the single or double doses, the grinder-closer being an electromechanical grind-by-time grinder-doser, the automatic calibration process being managed by a logic control unit having a management program, the automatic calibration process having a load cell electronic scale, the automatic calibration process comprising:

loading a container with an initial supply of coffee beans, the container and the coffee beans having a weight;

setting desired values of a weight of the ground coffee by an operator for each of the single or double doses such that a grinding time is assigned to the set desired values of weight and act as a provisional pre-set, parameter for the grinder-doser;

continuously self-calibrating by the grinder-doser during a dispensing of the dose of the coffee beans through a series of cycles so as to act as a feedback loop, the series of cycles being carried out automatically independent of grinding operations, the series of cycle being one after the other such that an execution of the series of cycles takes place automatically after all of the grinding operations, the series of cycles for checking a quantity of coffee actually dispensed from a previous grinding operation;

controlling and dispensing a dispensed dose of the ground coffee in each cycle of the series of cycles;

weighing the dispensed dose of ground coffee following the grinding after the grinder-doser is off;

setting and resetting a grinding duration in accordance with the desired weight; and automatically detecting a weight loss of the coffee beans from the container corresponding to the ground and dispensed dose of coffee by measuring the weight of the container and the remaining coffee beans in the container by the load cell electronic scale, the load cell electronic scale being directly connected to and controlled by the logic control unit such that the step of continuously self-calibrating is carried out without an intervention of an operator, the step of continuously self-calibrating comprising the following segmental steps of:

automatically checking by detecting of doses dispensed such that at an end of the dispensing, with a motor of the grinder-doser stopped, a loading device detects a variation of weight by the load cell for at least three successive single doses and at least three successive double doses, wherein the step of automatically checking comprises detecting the progressive variation of the weight of the actual dispensed dose by the load cell for at least four single doses and at least four double doses;

automatically processing the detected data of the step of automatically checking so as to determine new grinding durations, wherein the step of automatically processing comprises:

ordering according to a magnitude of values of the detected weight:

eliminating extreme values of a heaviest weight and a lightest weight for each dose:

calculating mean weights for each dose; and calculating by direct proportion the new grinding durations according to the mean weights of the doses actually dispensed so as to obtain a dispensing approximately equal to the determined grinding times for the single doses and the double doses; and automatically pre-setting the grinding durations by the logic control unit in accordance with the grinding duration of the step of automatically processing.

\* \* \* \* \*